United States Patent
Gerstendorfer et al.

(10) Patent No.: US 6,598,564 B2
(45) Date of Patent: Jul. 29, 2003

(54) NATURAL GAS SUPPLY APPARATUS

(75) Inventors: Helmut Gerstendorfer, Ober-Erlinsbach (CH); Joseph Pozivil, Allschwil (CH)

(73) Assignee: Cryostar-France SA, Hesingue (FR)

(*) Notice: Subject to any disclaimer, the term of this patent is extended or adjusted under 35 U.S.C. 154(b) by 0 days.

(21) Appl. No.: 10/226,878

(22) Filed: Aug. 23, 2002

(65) Prior Publication Data

US 2003/0054307 A1 Mar. 20, 2003

(30) Foreign Application Priority Data

Aug. 24, 2001 (GB) .............................................. 0120661

(51) Int. Cl.$^7$ ................................................ F22B 37/14
(52) U.S. Cl. .................................................... 122/448.1
(58) Field of Search ............................... 122/6 R, 13.3, 122/446, 448.1; 60/547.1, 592, 667, 39.465, 736

(56) References Cited

U.S. PATENT DOCUMENTS

| | | | | | |
|---|---|---|---|---|---|
| 3,670,752 A | * | 6/1972 | Marsden et al. | ............... | 137/13 |
| 3,850,001 A | * | 11/1974 | Locke | ......................... | 62/47.1 |
| 3,864,918 A | * | 2/1975 | Lorenz | ........................ | 60/651 |
| 4,231,226 A | * | 11/1980 | Griepentrog | ................. | 60/648 |
| 6,089,022 A | * | 7/2000 | Zednik et al. | ............. | 60/641.7 |

* cited by examiner

Primary Examiner—Gregory Wilson
(74) Attorney, Agent, or Firm—Philip H. Von Neida; Salvatore P. Pace

(57) ABSTRACT

Apparatus for supplying natural gas fuel to heat the boilers of an ocean-going tanker for the transport of liquefied natural gas (LNG) comprises a compressor having an inlet communicating with the ullage space of at least one LNG storage tank and an outlet communicating with a conduit leading from the compressor to fuel burners associated with the boilers, and a forced LNG vaporiser having an inlet communicating with a liquid storage region of the said tank and an outlet communicating with the same or a different conduit leading to fuel burners associated with the boilers.

3 Claims, 2 Drawing Sheets

NATURAL GAS SUPPLY APPARATUS

FIELD OF THE INVENTION

This invention relates to apparatus for supplying natural gas fuel for the purpose of heating the boilers of tankers that transport liquefied natural gas (LNG).

BACKGROUND OF THE INVENTION

An LNG tanker is conventionally propelled by one or more steam turbines. The tanker is thus provided with boilers to raise the steam. About 50% of the fuel that is required to be burnt in order to raise the steam provided from the LNG storage tanks themselves of the tanker. Since liquid natural gas has a boiling point at a temperature of about minus 162° C., even though the storage tanks are thermally insulated, the boiling point of liquid natural gas is so low that there is inevitably a continuous boil-off of LNG from the tankers, albeit at a modest rate. Conventional operation is to employ such natural boil-off to meet a part of the requirements for fuel of the boilers. The balance is met from a stock of a heavy hydrocarbon liquid fuel, sometimes referred to as "bunker oil".

It is however required that the tanker should have the capability of generating sufficient thermal energy from the combustion of the natural gas alone to raise all the steam required for its propulsion. Accordingly, the apparatus for supplying natural gas to the burners associated with the boilers additionally includes a forced vaporiser. In the tanker apparatus that has been used for the past 20 years there is a natural gas compressor which receives part of its feed from the ullage space of the LNG storage tanks and the remainder from the forced vaporiser. The forced vaporiser has an outlet temperature in the order of minus 40° C., chosen to be well above the dew point of the natural gas so as to ensure that there is no precipitation of liquid droplets in the inlet to the compressor. On the other hand the temperature of the natural gas taken from the ullage space of the tanks tends to be in the range of minus 100° C. to minus 140° C., the latter temperature obtaining when the tanker is fully laden with LNG, the former temperature obtaining when the tanker returns from making a delivery, a small amount of LNG having been retained for purposes of keeping the storage tanks at a suitable low temperature. In practice, therefore in this conventional apparatus the compressor has to be arranged so that it can operate at any natural gas inlet temperature in the range of minus 40° C. to minus 140° C. At the lower temperature the adiabatic work required to compress the gas is in the order of 20 to 25 kJ/kg whereas at the higher temperature it is in the order of 50 to 60 kJ/kg. The motor which drives the compressor therefore has to be able to cope with a wide range of duties. Typically, the motor is either provided with a frequency converter or is of a plural speed kind. Other disadvantages arise. In particular, it is necessary to employ a mist separator downstream of where the gas from the forced vaporiser is mixed with the natural boil-off gas so as to ensure that no particles of liquid are carried into the compressor, such particles being a potential source of liquid erosion damage to the impeller of the compressor.

There is therefore a need for an improved arrangement for providing natural gas as a fuel to raise steam in the boilers of the tanker and the invention aims at providing an apparatus that meets this need.

SUMMARY OF THE INVENTION

According to the present invention there is provided apparatus for supplying natural gas fuel to heat the boilers of an ocean-going tanker for the transport of LNG comprising a compressor having an inlet communicating with the ullage space of at least one LNG storage tank and an outlet communicating with a conduit leading from the compressor to fuel burners associated with the boilers, and a forced LNG vaporiser having an inlet communicating with a liquid storage region of the said tank and an outlet communicating with the same or a different conduit leading to fuel burners associated with the boilers.

The invention makes it possible to operate the compressor within a narrower temperature range, typically minus 140° C. to minus 100° C., thereby reducing greatly the amount of work required to compress the natural gas to a given pressure. As a result, a single speed motor without a frequency converter can typically be used to drive the compressor. Accordingly, the compressor drive arrangement is simplified. In addition, the power consumed by the compressor is reduced. There are two reasons for this. First, its average operating temperature is lower than in the known apparatus described above. Accordingly, the work needed to raise a unit quantity of this gas by a chosen pressure is less than in the known apparatus. Second, because the forced vaporiser exhausts downstream of the compressor, the rate of gas flow through the compressor is reduced in comparison with the known apparatus.

Preferably, the forced vaporiser has a second valve means to control the flow associated therewith, a first valve means operable to select its outlet temperature and a second valve means to control the flow rate of gas therethrough.

Typically, there is a gas heater downstream of the compressor. If the forced gas vaporiser communicates with the same conduit as the outlet from the compressor, the location in this conduit at which the forced vaporised gas encounters the compressed gas is preferably downstream of the gas heater.

BRIEF DESCRIPTION OF THE DRAWINGS

An apparatus according to the invention will now be described by way of example with reference to the accompanying drawings in which.

Like parts in FIGS. 1 and 2 are indicated by the same reference numerals.

DETAILED DESCRIPTION OF THE INVENTION

Figure 1:
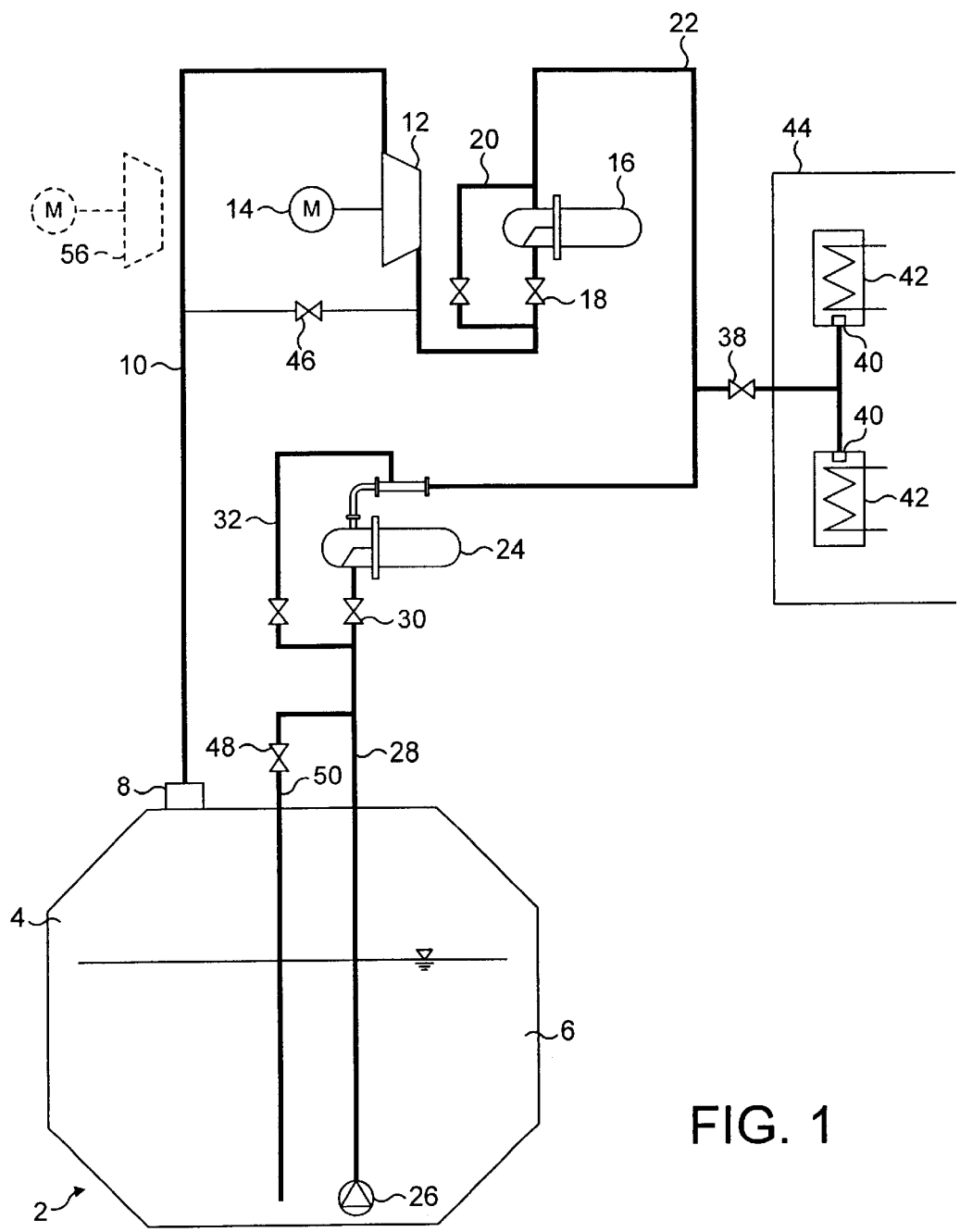
FIG. 1 is a schematic flow diagram of a first embodiment of the apparatus.

Referring to FIG. 1 of the drawings, an LNG storage tank 2 is located on board an ocean-going tanker (not shown). The tank 2 is vacuum-insulated or has another form of thermal insulation associated therewith so as to keep down in flow of heat from the ambient environment into the liquid therein. The tank 2 has an ullage space 4 and contains a volume 6 of LNG. Since LNG boils at a temperature well below ambient, notwithstanding the thermal insulation of the tank 2, there is a continuous evaporation of the LNG into the ullage space 4. The resulting vaporised gas flows out of the tank 2 though an outlet 8 and passes along a pipeline 10 to a compressor (or blower) 12. The compressor 12 is driven by an electric motor 14. The motor typically has a single speed and does not employ a frequency converter. The pressure of the gas is raised by operation of the compressor 12. The heat of compression is not nearly sufficient to raise the temperature of the gas being compressed to ambient temperature, such temperature being required for the operation of the boilers. The resulting compressed gas therefore passes through a gas heater 16 in which it is heated by steam (or other heating medium, e.g. hot water) so as to raise its temperature to approximately ambient temperature. To avoid overheating the gas, temperature control is provided by a valved by-pass line 20 extending from upstream to downstream of the gas heater 16. As a further measure of temperature control, the gas heater has on its upstream side a flow control valve 18 which is able to set so as to select the outlet temperature therefrom. The resulting heated gas passes into a conduit 22 in which it mixes with a second flow of vaporised natural gas.

The second flow of vaporised natural gas is formed by employing a forced vaporiser 24 to vaporise a flow of LNG taken by a submerged pump 26 from the volume 6 of LNG within the tank 2. The outlet of the pump 26 communicates with the forced vaporiser 24 via a riser 28. A pressure control valve 48 opens a pipe 50 to allow liquid to be returned to the storage tank 2 for different flow rates through the vaporiser 24. The forced vaporiser 24 has an enlarged superheating section to enable an outlet temperature of plus 20° C. to be readily achievable. The forced vaporiser 24 has an arrangement of valves similar to that associated with the gas heater 16. Thus, there is a first flow control valve 30 on the upstream side of the vaporiser 24 to set the outlet pressure of the heater 16 so that it is equal to the outlet pressure of the compressor 12, and a valved by-pass line 32 extending from upstream to downstream of the vaporiser 24 to control the outlet temperature of the vapour. The vaporiser 24 is typically of a kind which employs steam heating to raise the temperature of the fluid flowing therethrough.

The mixture of the gas supplied from the heater 18 and that supplied from vaporiser 24 passes through a master flow control valve 38 into burners 40 associated with boilers 42 in the engine room 44 of the tanker. The master flow control valve 38 is located in operation, the heat generated by firing of the burners 40 raises steam in the boilers 42. Steam is used to drive a turbine (not shown) that provides propulsive power for the tanker.

The apparatus according to the invention preferably has various safety measures to cope with any unexpected operating conditions. For example, a surge valve 46 automatically opens a by-pass around the compressor 12 should a surge condition in the compressor 12 occur. Similarly, the submerged pump 26 is protected by the minimum flow by-pass valve 48 as described above.

In a typical example of the operation of the apparatus shown in the drawing, the compressor 12 receives boil-off gas from the ullage space 4 of the tank 2 at a temperature of minus 140° C. and as (absolute) pressure of 106 kPa. The gas is duly raised in pressure by operation of the compressor 12 to a pressure of 196 kPa. The exit temperature of the compressor 12 is in the order of minus 110° C. The gas heater 18 raises the temperature of the gas from minus 110° C. to plus 20° C. There is a small drop in pressure through the gas heater, typically in the order of 10 kPa. The gas which leaves the heater 18 is mixed with a gas stream at the same temperature and pressure from the forced vaporiser 24. The feed to the forced vaporiser 24 is provided by the pump 26 at a pressure in the range of 300 kPa to 500 kPa and a temperature in the order of minus 160° C.

The above example applies to an instance in which the tank 2 is fully laden with LNG. Typically, not all the LNG is delivered at the tanker's destination. Some is retained for the purposes of cooling the storage tank 2 during the return journey to the LNG supply terminal. Typically, since the storage tank 2 contains much less LNG on the return journey, the temperature in the ullage space rises to something in the order of minus 100° C. Accordingly, the temperature of the outlet of the compressor 12 rises to about minus 70° C.

Although only one storage tank is shown in the drawing, in practice, a single assembly of compressor, gas heater and forced vaporiser is able to serve any number of storage tanks. The LNG tanker is typically required to have a standby compressor 56, a standby (off-line) gas heater (not shown) and a standby vaporiser (not shown) which can be used in the event of any malfunction of the on-line components.

By having forced vaporiser 24 discharge into the heated gas stream rather than into the gas stream upstream of the compressor, a number of advantages can be obtained. Firstly, a simple single speed motor 14 may be employed to drive the compressor 12. Secondly, the size of the compressor 12 and the motor 14 may be reduced. Thirdly, because the compressor receives only natural gas from the ullage space 4 of the vessel 2, and does not have the output of the forced vaporiser mixed with it, its control is simplified. Fourthly, because a smaller motor can be used, energy savings result. In addition, energy savings are made possible by virtue of the fact that the gas from the forced vaporiser does not have to be recompressed.

Another advantage resides in the fact that no mist separator downstream of either the forced vaporiser or upstream of the compressor is required.

Typically the pump 26 is one that is normally provided in the tank 2 for other purposes. Thus, no dedicated liquid pump needs to be installed.

Figure 2:
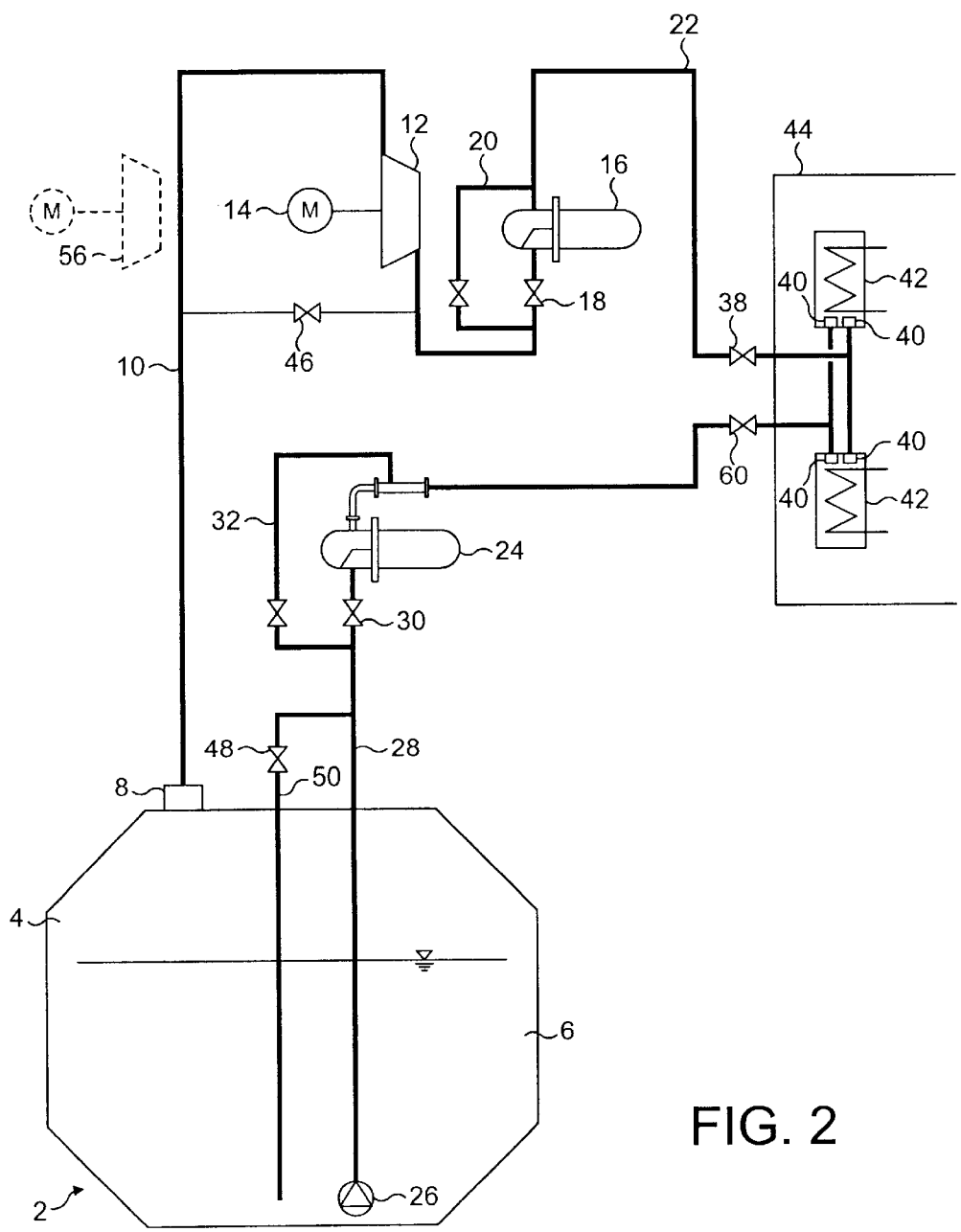
FIG. 2 is a schematic flow diagram of a second embodiment of the apparatus.

Various changes and modifications may be made to the apparatus shown in the drawing. For example, outlet from the forced vaporiser 24 may communicate with a conduit (not shown) other than the conduit 22. Further the other conduit may communicate with a different burner or burners (not shown) from the ones in communication with the conduit 22. In this alternative arrangement, the discharge pressure of the compressor 12 would be lower and therefore its size would be less than that shown in the drawing. Further, the flow control systems of the compressor 12 and the vaporiser 24 would become completely independent of one another. In addition, control of the operation of the burners would be facilitated. Such an arrangement is shown in FIG. 2 of the drawings. Now, only some of the burners 40 communicate with the conduit 22. The remainder of the burners 40 communicate via a flow control valve 60 with the vaporiser 24. The flow control valve 60 controls the flow or pressure downstream of the vaporiser 24. Now the valve 30 is a temperature control valve which sets the downstream temperature. Typically, for low flow rates from the vaporiser 24 the pressure drop is insufficient to provide an adequate flow through the by-pass line 32. Accordingly, if the by-pass line 32 is fully open, the position of the valve 30 is adjusted so as to throttle the inlet to the vaporiser 24 and hence cause more liquid to flow through the by-pass line 32. Typically, a split range control may be used to adjust the valve 30 and the valve in the by-pass line 32. Thus a 0 to 50% signal can be employed to open the valve in the by-pass line, and the remaining 50–100% signal is employed to operate the valve 30 so that it throttles the inlet to the vaporiser 24. The same control principle may be used in the operation of the gas heater 16.

In a modification of the apparatus shown in FIG. 1, the union of the conduit 22 with the outlet conduit from the vaporiser 24, and the valve 38 may both be located within the engine room 44.

What is claimed is:

1. Apparatus for supplying natural gas fuel to heat the boilers of an ocean-going tanker for the transport of liquefied natural gas comprising a compressor having an inlet communicating with the ullage space of at least one liquefied natural gas storage tank and an outlet communicating with a conduit leading from the compressor to fuel burners associated with the boilers, and a forced liquefied natural gas vaporiser having an inlet communicating with a liquid storage region of the said tank and an outlet communicating with the same or a different conduit leading to fuel burners associated with the boilers.

2. Apparatus according to claim 1, in which the outlet of the compressor and the outlet of the forced liquefied natural gas vaporiser communicate with a common conduit.

3. Apparatus according to claim 1, in which the outlet of the compressor and the outlet of the forced liquefied natural gas vaporiser communicate with different conduits.

\* \* \* \* \*

(12) INTER PARTES REEXAMINATION CERTIFICATE (0150th)
United States Patent
Gerstendorfer et al.

(10) Number: US 6,598,564 C1
(45) Certificate Issued: Mar. 16, 2010

(54) NATURAL GAS SUPPLY APPARATUS

(75) Inventors: Helmut Gerstendorfer, Ober-Erlinsbach (CH); Joseph Pozivil, Allschwil (CH)

(73) Assignee: Cryostar-France SA, Hesingue (FR)

Reexamination Request:
No. 95/000,156, Jul. 19, 2006

Reexamination Certificate for:
Patent No.: 6,598,564
Issued: Jul. 29, 2003
Appl. No.: 10/226,878
Filed: Aug. 23, 2002

(30) Foreign Application Priority Data

Aug. 24, 2001 (GB) .............................................. 0120661

(51) Int. Cl.
*B63J 5/00* (2006.01)
*F17C 9/02* (2006.01)
*F17C 9/00* (2006.01)
*B63H 21/00* (2006.01)
*B63B 25/16* (2006.01)
*B63B 25/00* (2006.01)
*F22B 37/14* (2006.01)

(52) U.S. Cl. .................................................. 122/448.1
(58) Field of Classification Search .................. 122/6 R, 122/13.3, 446, 448.1; 60/547.1, 592, 667, 60/39.465, 736
See application file for complete search history.

(56) References Cited

U.S. PATENT DOCUMENTS 2,668,915 A * 2/1954 Dickey ........................... 290/2
3,766,734 A * 10/1973 Jones ....................... 60/39.281

FOREIGN PATENT DOCUMENTS

| JP | 56-116995 | 9/1981 |
|---|---|---|
| JP | 63-54938 | 4/1988 |
| JP | 6-123569 | 5/1994 |
| JP | 6-336192 | 12/1994 |
| JP | 2001-315693 | 11/2001 |

OTHER PUBLICATIONS

"directly," Webster's Third International Dictionary, unabridged. Copyright © 2001–2008 ProQuest LLC. [retrieved Apr. 8, 2008 from <http://lionreference.chadwyck.com/initRefShelfSearch.do?initialise=true&listType=mwd>].*

Kawakami, et al., "Outlook of Ultra Low Temperature LNG Boil–Off Gas Compressor", *Ishikawajima–Harima Engineering Review*, vol. 24, No. 1 (Jan. 1984), pp. 34–40, p. 78.

Compressors Design Department, "IHI Ultralow–Temperature LNG Compressor", *Ishikawajima–Harima Engineering Review*, Mar. 1973, pp. 168–171,

* cited by examiner

*Primary Examiner*—Sara Clarke

(57) ABSTRACT

Apparatus for supplying natural gas fuel to heat the boilers of an ocean-going tanker for the transport of liquefied natural gas (LNG) comprises a compressor having an inlet communicating with the ullage space of at least one LNG storage tank and an outlet communicating with a conduit leading from the compressor to fuel burners associated with the boilers, and a forced LNG vaporiser having an inlet communicating with a liquid storage region of the said tank and an outlet communicationg with the same or a different conduit leading to fuel burners associated with the boilers.

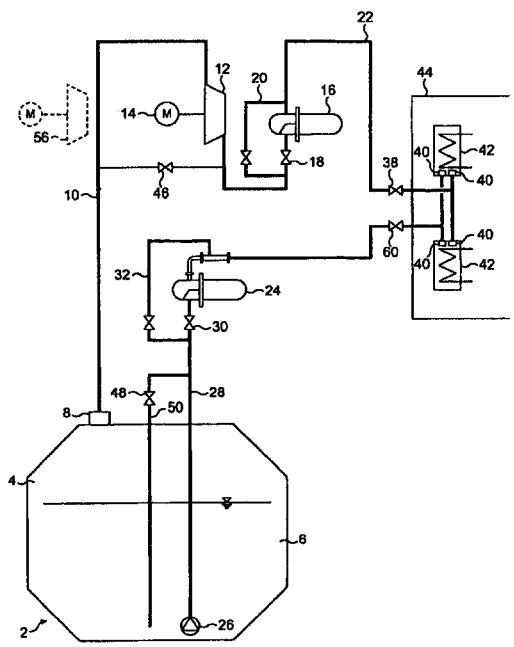

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3 are cancelled.

New claim 4 is added and determined to be patentable.

4. *Apparatus for supplying natural gas fuel to heat the boilers of an ocean-going tanker for the transport of liquefied natural gas comprising a compressor having an inlet communicating with the ullage space of at least one liquefied natural gas storage tank and an outlet communicating with a conduit leading from the compressor to fuel burners associated with the boilers, and a forced liquefied natural gas vaporizer having an inlet communicating with a liquid storage region of the said tank and an outlet communicating with a different conduit leading to fuel burners associated with the boilers.*

* * * * *